June 10, 1958     G. H. DIMOND     2,837,885
CAPPING CHUCK
Filed March 22, 1955     2 Sheets-Sheet 1
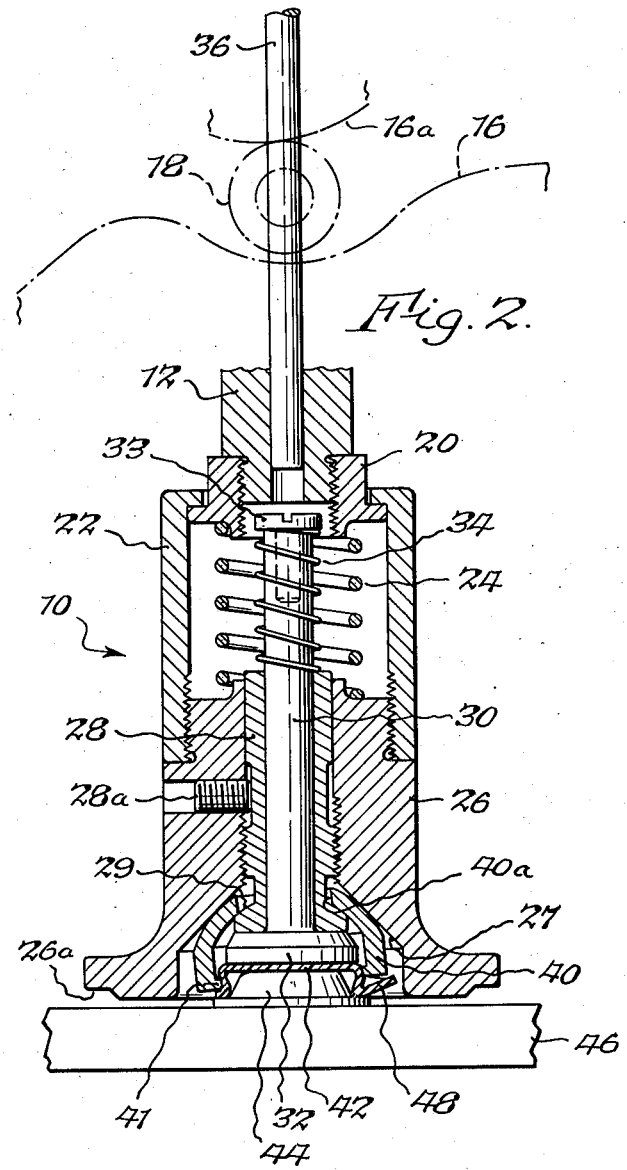
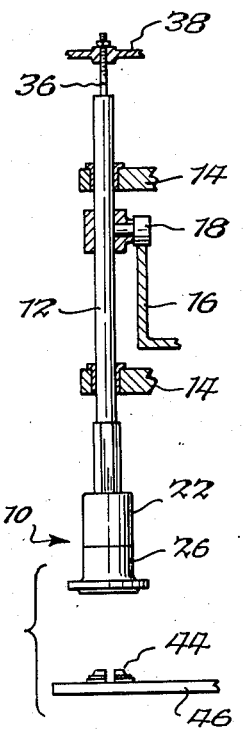
INVENTOR.
George H. Dimond
BY
John J. McGlew
Attorney.

June 10, 1958 — G. H. DIMOND — 2,837,885
CAPPING CHUCK

Filed March 22, 1955 — 2 Sheets-Sheet 2

INVENTOR.
George H. Dimond
BY
John J. McGlew
Attorney.

United States Patent Office 2,837,885
Patented June 10, 1958

2,837,885

CAPPING CHUCK

George H. Dimond, East Aurora, N. Y., assignor to Consolidated Packaging Machinery Corporation, Buffalo, N. Y., a corporation of New York Application March 22, 1955, Serial No. 495,843

8 Claims. (Cl. 53—369)

This invention relates in general to capping chucks for machines which are adapted to place plastic caps onto successively presented containers, and in particular refers to a new and useful capping chuck for effecting placement onto containers of caps which have laterally extending projections thereon, even when the projections on these caps are not uniformly aligned in one direction prior to their engagement by the chuck.

Capping chucks have been proposed heretofore which have been satisfactory for automatically operating capping machines where the caps used (either plastic or metallic) have unobstructed side areas around their tops, permitting their engagement by a capping chuck. However, it was not possible for such chucks to handle caps having laterally extending projections which were up high enough on the sides of the cap to interfere with their gripping engagement by a chuck. Whenever attempts were made to handle such caps with previously known chucks they would merely contact the lateral projections on the side of a cap and cock the cap at an angle which would make further gripping impossible. It was not feasible to provide mechanism which would uniformly align the caps (i. e., position the caps with their side projections all facing the same way) and therefore the capping chucks could not merely be notched so as to span the projection in order to permit reasonable operation with such caps. If mechanisms were available to position the caps in one uniform direction it would still be likely that the caps would become misaligned prior to their engagement by a chuck and their projections would not be in register with any notch provided on the chuck.

The present invention overcomes the above disadvantages by providing a gripping mechanism on a novel chuck having a dome-shaped gripping element which operates to move up out of the way of projections on caps and effectively grip the remaining portions. The gripping mechanism includes a dome or inverted pick-up cup provided with an inwardly directed cap-engaging annulus at the bottom. The dome is free to wobble in a defined area so that it is tilted upwardly in the spot immediately above the projection on a cap upon contacting the latter, and the other portions of the dome move downwardly into gripping engagement with the remaining portions of the cap top.

Accordingly, it is an object of this invention to provide a capping chuck capable of handling resilient caps which have a laterally extending protuberance or lug thereon and which are not aligned in one direction prior to their engagement by said chuck.

It is a further object of this invention to provide a chuck of the character described, including a dome or inverted semi-spherical pick-up cup having a central opening at the top and an inwardly projecting cap-engaging annulus at the bottom which cup is arranged about a flanged bottomed sleeve and is freely oscillatable and rotatable in a chamber defined by an upper, generally spherical top surface of the flange at the bottom of said sleeve and the generally frusto-conical bottom inner surface of a body piece, the pick-up cup being effective to wobble into engagement with a portion of the top of the cap away from any projection thereon. The chuck includes in addition a stripper spindle which is spring biased upwardly through the sleeve and is effective upon the contacting of a container lip by the body piece to be moved downwardly to seat a cap on a container.

It is a further object to provide a capping chuck of the character described which is rugged in construction, simple in design and inexpensive to manufacture.

In the drawings:

Fig. 1 is a front elevation partly in section of a single spindle assembly of a capping machine and shows the operating mechanism for a capping chuck constructed in accordance with this invention;

Fig. 2 is an enlarged transverse vertical section of a capping chuck constructed in accordance with this invention and showing the chuck at the start of the capping cycle and the relative position of the capping chuck cam follower;

Fig. 3 is a perspective view of a cap which may be handled by the chuck of Fig. 2;

Figure 5:
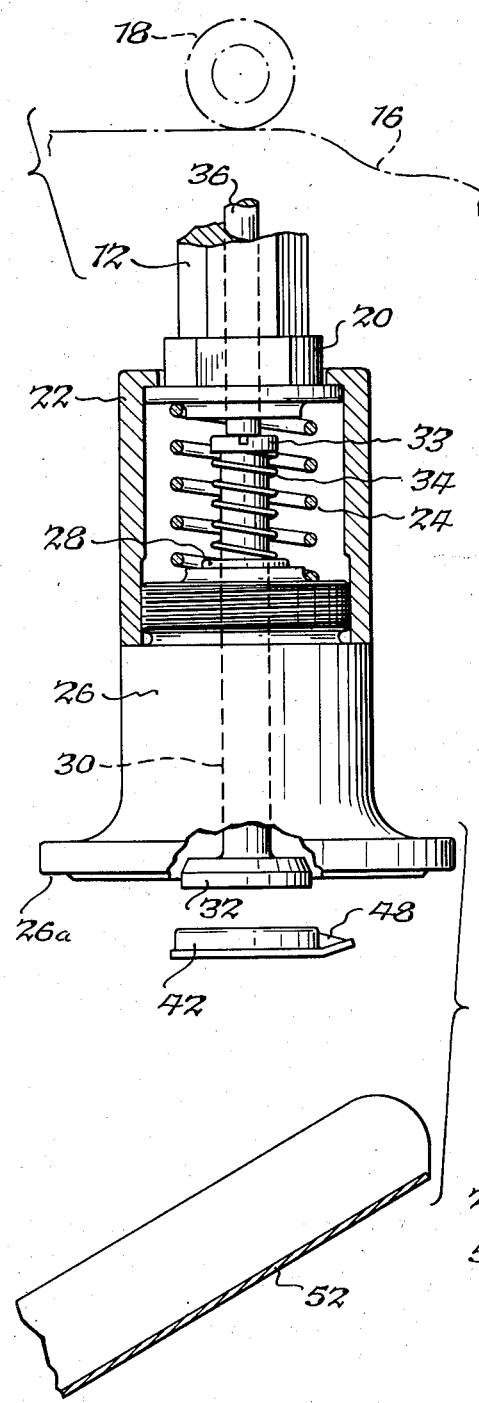
Fig. 5 is a view similar to Figs. 2 and 4, but showing the capping chuck in position for discharging a cap whenever a container may not have been present during a cycle of chuck operation.

Referring to the drawings in detail, the invention as embodied therein comprises a capping chuck generally designated 10 which is mounted on the lower end of a spindle 12 reciprocably carried in suitable bearings in two spindle plates 14, 14 in a turret of a capping machine (not shown). The capping chuck 10 is reciprocated under the control of a cylinder cam 16 and a spring-loaded presser cam 16a which remains stationary, but which are operatively engaged by a roller follower 18 mounted on the spindle 12. The spindle plates 14, 14 are constantly rotated by known mechanisms (not shown) resulting in the reciprocation of the capping chuck 10 by the action of the cam follower 18 which is moved along the upper surface of the cam 16 by the rotation of the spindle plates 14.

The chuck 10 is connected to the lower end of the spindle 12 through the medium of a flanged hub 20 which is threaded onto the lower end of the spindle. The chuck 10 comprises a bell-shaped member 22 having an opening in the top thereof permitting it to span the hub 20 with its inside flanged top portion normally resting on the flange of the hub 20. The flange of the hub 20 and that of the bell-shaped member 22 are normally maintained in contact by a compression spring 24 which extends between the flange of the hub 20 and a generally cylindrical chuck body piece 26 threadably engaged with the lower end of the bell-shaped member 22.

The bottom of the body piece 26 is flanged and the under side thereof is provided with a ledge 26a adapted to engage the rims of containers which are to be capped. The bottom inner portion of the piece 26 is bored or milled in a definite manner to provide a generally cylindrical recess adjacent the bottom thereof and a generally frusto-conical recess 27 extending upwardly thereabove. The central portion of the body piece 26 is provided with a bore above the frusto-conical recess and is internally threaded to receive a sleeve 28.

The sleeve 28 is a long cylinder which fits tightly into the body piece 26 and has threads intermediate its height which engage those on the inside of the body piece. The lower portion of the sleeve 28 is flanged and the upper surface of the flanged portion is generally spherically shaped as at 29. The upper spherically shaped flanged area 29 and the frusto-conically shaped recess 27 of the body piece 26 define a chamber for the operation of the chuck cap-engaging means which will be described more fully hereinafter. In order to secure the sleeve 28 after the distance from the top surface 29 of the flange part of the sleeve 28 to the frusto-conical recess 27 of the body piece 26 has been adjusted, a set screw 28a is provided which is threaded into the inside of the body piece 26 and bears against the sleeve 28.

A stripper spindle 30 having a disc or plunger 32 affixed to the bottom end thereof is slidably carried within the sleeve 28 with the plunger 32 extending below the lower end thereof. The upper portion of the spindle is provided with a cap screw 33 which retains a compression spring 34 therebelow between it and an abutment shoulder on the sleeve 28 and which is effective to constantly urge the spindle 30 upwardly, bringing the top of the plunger 32 into contact with the bottom of the sleeve 28.

A depending stripper rod 36 is affixed to a bracket 38 mounted on the upper spindle plate 14 and projects downwardly inside the hollow spindle 12. The spindle 12 is reciprocated by the action of the cam 16 through the cam follower 18 to raise the chuck 10 so that the stripper rod 36 becomes effective relatively to push downwardly against the cap screw 33 on top of the stripper spindle 30 for cap ejecting purposes whenever the cam follower 18 approaches a high portion of the cam 16 (see Fig. 5). In this position the lower end of the stripper rod 36 is below the bottom of the spindle 12 and the plunger 32 extends below the ledge 26a of the chuck body piece 26.

In accordance with the invention I have provided a novel cap pick-up cup or dome 40 which is semi-spherical in shape and which contains an opening 40ª in the top thereof. The dome 40 is arranged to span the lower end of the sleeve 28 with the upper inside surface thereof resting on the spherically shaped flanged portion 29 of the sleeve. In this position the dome 40 is free to oscillate or wobble in the chamber defined by the frusto-conical recess 27 of the body piece 26 and the spherically shaped flanged portion 29 of the sleeve 28. The bottom inside portion of the dome 40 is provided with an inwardly extending annulus 41 which is provided to grippingly engage the caps.

In the operation of the machine, mechanisms (not shown) are provided to feed a somewhat flexible cap 42 onto a stud 44 of a moving cap disc or table 46. Means (not shown) are then provided to rotate the spindle plates 14 to cause the cam follower 18 to move over the surface of the cylinder cam 16. The capping chuck 10 is moved into overhead alignment with the cap 42 and thereupon the cam 16 becomes effective to permit the follower 18 and its associated spindle 12 carrying the capping chuck 10 to move downwardly as shown in Fig. 2 until the capping chuck 10 comes into engagement with the cap 42. As the dome 40 comes down over the cap it first contacts a protuberance or lug 48 on the cap 42 which urges upwardly the connecting edge portion of the dome 40 as the chuck continues its downward movement, and since it is arranged to wobble about the flanged portion 29 of the sleeve 28, the opposite side moves downwardly to permit the entire annulus 41 to engage the periphery of the cap in a plane at a slight angle from the horizontal. The annulus 41 is effective to frictionally grip the cap sufficiently to permit it to be transported by the capping chuck for application to a container 50.

Figure 4:
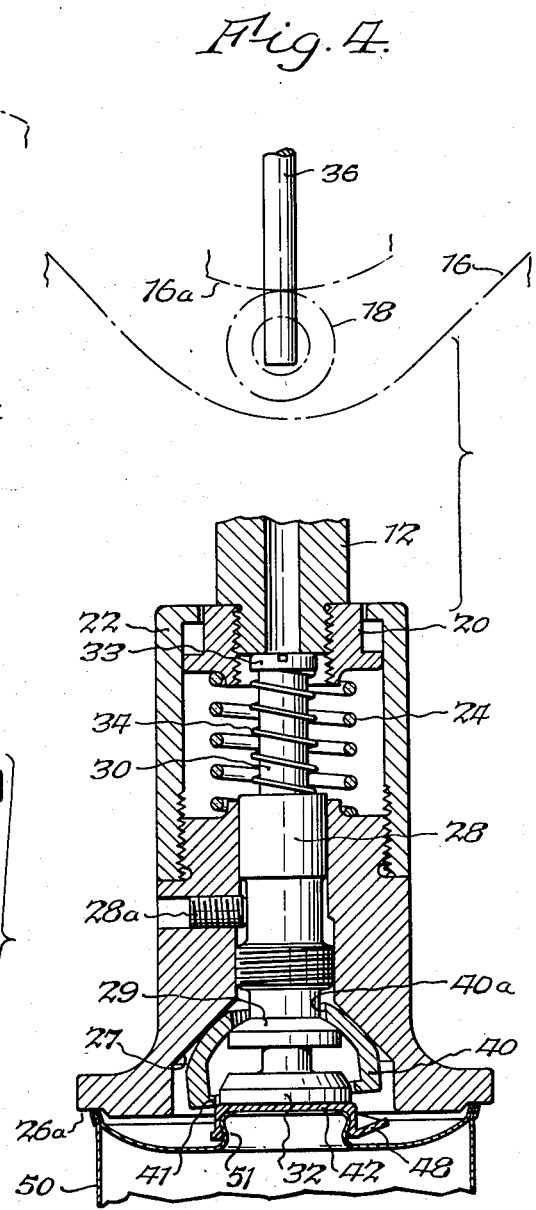
Fig. 4 is a vertical section similar to Fig. 2, but showing the capping chuck in position immediately after applying the cap to a container.

Mechanisms in the machine (not shown) become effective to move a container 50 into alignment with the capping chuck 10, and the latter is caused to reciprocate by the action of the cam 16 to cause the chuck to move downwardly over the container. Referring to Fig. 4 of the drawings, it can be seen that the ledge 26a of the body piece 26 contacts the upper rim of the container 50, stopping its downward movement, and the dome 40 positions a cap in alignment with a filling neck 51 of the container 50. As the spindle 12 continues its downward movement relative movement takes place between the body piece 26 and the sleeve 28 against the resistance of the compression springs 24 and 34 to cause the plunger 32 to disengage the cap 42 from the annulus 41 of the dome 40 and to apply the cap to the filling neck 51 of the container. Thereafter the cam 16 becomes effective to raise the spindle 12 to disengage the chuck from the container and to permit its parts to return to their original relative positions under the influence of the springs 24 and 34.

Whenever for any reason no container is present during a capping cycle of a chuck or the capping chuck fails to come into operative engagement with a container which is present, the failure of the chuck body 26 to operatively contact the rim of a container will prevent the plunger 32 from disengaging a cap from the dome 40, and the cap must subsequently be ejected. By referring to Fig. 5 of the drawings it will be seen that when the cam follower 18 reaches a high portion on the cam 16 the lower end of the stripper rod 36 extends beyond the bottom of the spindle 12 and contacts the cap screw 33 of the stripper spindle 30 to move the plunger 32 relatively downwardly and eject a cap from the dome 40. A discharge chute 52 is arranged below the capping chuck 10 to receive caps thus ejected.

The invention provides a capping chuck with an easily operable cap-engaging dome which will satisfactorily grip resilient caps which have laterally extending lugs. Because of the novel arrangement of the dome, permitting it to wobble upon contacting a lug so that the portions of the cap free of the lug may be gripped by the chuck dome, it is now possible to automatically cap containers with caps which could not be manipulated by a capping chuck heretofore.

While a specific embodiment of the invention has been shown and described in detail to illustrate the application of the invention principles, it will be understood that the invention may be embodied otherwise without departing from such principles.

I claim:

1. A container capping chuck for applying caps having a laterally extending projection thereon, comprising a cylindrical body piece having a container-engaging ledge at the bottom thereof and provided with an internal centrally located, generally frusto-conical recess extending upwardly from the bottom thereof, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, a generally semi-spherical dome having an opening at the top and an inwardly projecting cap-engaging annulus at the bottom thereof and positioned around said sleeve with the inside upper portion thereof resting on the upper surface of the flanged portion of said sleeve whereby, within the limits permitted by the size of the top opening thereof, to be freely oscillatable in the chamber defined by the upper surface of the flanged portion of said sleeve and the frusto-conical recess of said body piece, said stripper spindle being relatively movable downwardly with respect to said body piece, said sleeve and said dome, whereby to effect the disengagement of any cap from said dome and to apply a cap held thereby to a container positioned in capping association with said chuck.

2. A container capping chuck for applying caps having a laterally extending projection thereon, comprising a cylindrical body piece having a container-engaging ledge at the bottom thereof and provided with an internal centrally located, generally frusto-conical recess extending upwardly from the bottom thereof, a bell-shaped member having an inwardly flanged top terminating in a central opening and threadably secured at its bottom to the upper portion of said body piece, a hub extending upwardly through the opening in the top of said bell-shaped member and having a lower flanged portion engageable with the flange of said bell-shaped member, a compression spring extending between the lower flanged portion of said hub and the upper portion of said body piece to normally maintain the flange of said hub and said bell-shaped member in contact with each other, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, and a generally semispherical dome having an opening at the top and an inwardly projecting cap-engaging annulus at the bottom thereof and positioned around said sleeve with the inside upper portion thereof resting on the upper surface of the flanged portion of said sleeve whereby, within the limits permitted by the size of the top opening thereof, to be freely oscillatable in the chamber defined by the upper surface of the flanged portion of said sleeve and the frusto-conical recess of said body piece, said stripper spindle being relatively moveable downwardly whereby to effect the disengagement of any cap from said dome and to apply a cap held thereby to a container positioned in capping association with said chuck.

3. In a container capping machine wherein is provided a vertically reciprocable capping spindle, means for reciprocably supporting said capping spindle, and means for cyclically reciprocating said capping spindle, the combination of: a capping chuck secured to the lower end of the capping spindle and including a cylindrical body piece having a container-engaging ledge at the bottom thereof and provided with an internal centrally located, generally frusto-conical recess extending upwardly from the bottom thereof, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, a generally semi-spherical dome having an opening at the top and an inwardly projecting cap-engaging annulus at the bottom thereof and positioned around said sleeve with the inside upper portion thereof resting on the upper surface of the flanged portion of said sleeve whereby, within the limits permitted by the size of the top opening thereof, to be freely oscillatable in the chamber defined by the upper surface of the flanged portion of said sleeve and the frusto-conical recess of said body piece, said stripper spindle being relatively movable downwardly with respect to said body piece, said sleeve and said dome, whereby to effect the disengagement of any cap from said dome and to apply a cap held thereby to a container positioned in capping association with said chuck.

4. In a container capping machine wherein is provided a vertically reciprocable capping spindle, means for reciprocably supporting said capping spindle, and means for cyclically reciprocating said capping spindle, the combination of: a capping chuck secured to the lower end of the capping spindle and including a cylindrical body piece having a container-engaging ledge at the bottom thereof and provided with an internal centrally located, generally frusto-conical recess extending upwardly from the bottom thereof, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, a generally semi-spherical dome having an opening at the top and an inwardly projecting cap-engaging annulus at the bottom thereof and positioned around said sleeve with the inside upper portion thereof resting on the upper surface of the flanged portion of said sleeve whereby, within the limits permitted by the size of the top opening thereof, to be freely oscillatable in the chamber defined by the upper surface of the flanged portion of said sleeve and the frusto-conical recess of said body piece.

5. In a container capping machine wherein is provided a vertically reciprocable capping spindle, means for reciprocably supporting said capping spindle, and means for cyclically reciprocating said capping spindle, the combination of: a capping chuck secured to the lower end of the capping spindle and including a cylindrical body piece having a container-engaging ledge at the bottom thereof and provided with an internal centrally located, generally frusto-conical recess extending upwardly from the bottom thereof, a bell-shaped member having an inwardly flanged top terminating in a central opening and threadably secured at its bottom to the upper portion of said body piece, a hub extending upwardly through the opening in the top of said bell-shaped member and having a lower flanged portion engageable with the flange of said bell-shaped member, a compression spring extending between the lower flanged portion of said hub and the upper portion of said body piece to normally maintain the flange of said hub and said bell-shaped member in contact with each other, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, and a generally semi-spherical dome having an opening at the top and an inwardly projecting cap-engaging annulus at the bottom thereof and positioned around said sleeve with the inside upper portion thereof resting on the upper surface of the flanged portion of said sleeve whereby, within the limits permitted by the size of the top opening thereof, to be freely oscillatable in the chamber defined by the upper surface of the flanged portion of said sleeve and the frusto-conical recess of said body piece.

6. In a container capping machine wherein is provided a vertically reciprocable capping spindle, means for reciprocably supporting said capping spindle, and means for cyclically reciprocating said capping spindle, the combination of: a capping chuck secured to the lower end of the capping spindle and including a cylindrical body piece having a container-engaging ledge at the bottom thereof and provided with an internal centrally located, generally frusto-conical recess extending upwardly from the bottom thereof, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, a generally semi-spherical dome having an opening at the top and an inwardly projecting cap-engaging annulus at the bottom thereof and positioned around said sleeve with the inside upper portion thereof resting on the upper surface of the flanged portion of said sleeve whereby within the limits permitted by the size of the top opening thereof to be freely oscillatable in the chamber defined by the upper surface of the flanged portion of said sleeve and the frusto-conical recess of said body piece, means effective upon the contacting of a container by the ledge of said body piece to effect relative motion between said body piece and said stripper spindle to move said stripper spindle downwardly whereby to seat a cap on said container and to disengage it from said dome, and means effective upon the upward movement of said chuck to move said stripper spindle downwardly relative to said body piece.

7. In a container capping machine wherein is provided a vertically reciprocable capping spindle, means for reciprocably supporting said capping spindle, and means for cyclically reciprocating said capping spindle, the combination of: a capping chuck secured to the lower end of the capping spindle and including a cylindrical body piece having a container-engaging ledge at the bottom thereof and provided with an internal centrally located, generally frusto-conical recess extending upwardly from the bottom thereof, an upper bell shaped member having a central opening at the top thereof and threadably secured at its bottom to the upper portion of said body piece, a hub extending upwardly through the opening in the top of said bell-shaped member and having a lower flanged portion spring-biased upwardly against the inside top of said bell-shaped member, a compression spring extending between the lower flanged portion of said hub and the upper portion of said body piece to bias said hub and said body piece in opposite directions to one another, a vertically extending sleeve secured within said body piece and provided with a lower flanged portion having a generally spherical upper surface positioned within the frusto-conical recess of said body piece, an upwardly biased stripper spindle slidably carried within said sleeve and having a flanged plunger portion at the lower end thereof extending beyond the bottom of said sleeve, a generally semi-spherical dome having an opening at the top and an inwardly projecting cap-engaging annulus at the bottom thereof and positioned around said sleeve with the inside upper portion thereof resting on the upper surface of the flanged portion of said sleeve whereby within the limits permitted by the size of the top opening thereof to be freely oscillatable in the chamber defined by the upper surface of the flanged portion of said sleeve and the frusto-conical recess of said body piece, a stationary stripper rod positioned within said capping spindle and effective to protrude below said capping spindle during the upper portion of reciprocation on said spindle to thereby move said stripper spindle downwardly whereby to eject a cap from said dome, in the event one is present therein.

8. A container capping chuck for applying caps having a laterally extending projection thereon, comprising a body piece provided with an internal recess, a generally semi-spherical dome pivotally mounted inside the recess of said body piece and provided with an inwardly projecting cap-engaging annulus at the bottom thereof, means defining the pivotal boundary of said dome to permit said dome to wobble upon the contacting of a projection on a cap by the annulus thereon whereby to cause the annulus to grippingly engage the caps with the dome in a tilted position displaced upwardly above the projection on the cap, and means inside said dome and relatively reciprocable with respect thereto whereby to effect the disengagement of any cap from said dome and to apply a cap held thereby to a container positioned in capping association with said chuck.

References Cited in the file of this patent

UNITED STATES PATENTS

| | | |
|---|---|---|
| 1,400,556 | Krus | Dec. 20, 1921 |
| 2,422,750 | Rue | June 24, 1947 |
| 2,427,376 | Weaver | Sept. 16, 1947 |